United States Patent [19]
Dally et al.

[11] 3,738,162
[45] June 12, 1973

[54] FATIGUE DAMAGE INDICATOR
[75] Inventors: James W. Dally, Silver Spring, Md.; Gustavo A. Panizza, Chicago, Ill.
[73] Assignee: The United States of America as represented by the Secretary of the Army, Washington, D.C.
[22] Filed: Sept. 10, 1971
[21] Appl. No.: 179,370

[52] U.S. Cl. ............................. 73/88.5 R, 252/511
[51] Int. Cl. .............................................. G01l 5/00
[58] Field of Search ................ 252/511; 73/88.5 R; 338/2

[56] References Cited
UNITED STATES PATENTS
2,252,464   8/1941   Kearns, Jr. et al. .............. 252/511 X
3,099,578   7/1963   Hunter ............................ 252/511 X
3,603,142   9/1971   Saylak et al. ..................... 73/88.5 R
3,289,135   11/1966  Anderson et al. ................. 73/88.5 R

*Primary Examiner*—Jerry W. Myracle
*Attorney*—Harry M. Saragovitz, Edward J. Kelly and Herbert Berl

[57] ABSTRACT

In a fatigue damage indicator system comprising a work piece structure, carrier and sensing means operably connected to indicator means; the improvement wherein the sensing means are composed of a conductive material dispersed in a matrix of an insulating material.

1 Claim, 4 Drawing Figures

PATENTED JUN 12 1973 3,738,162
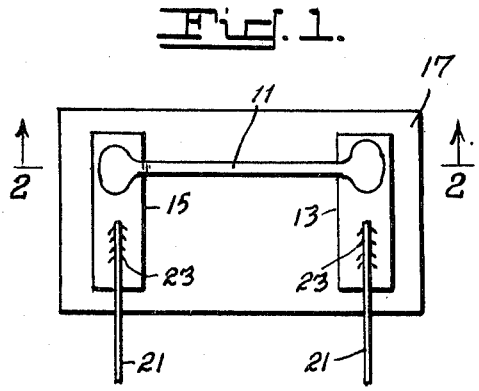
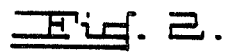
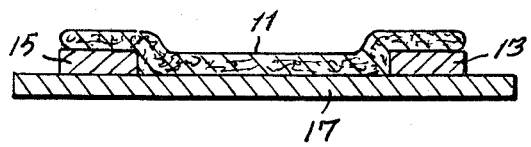
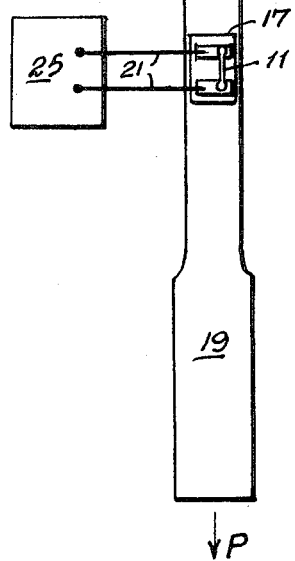
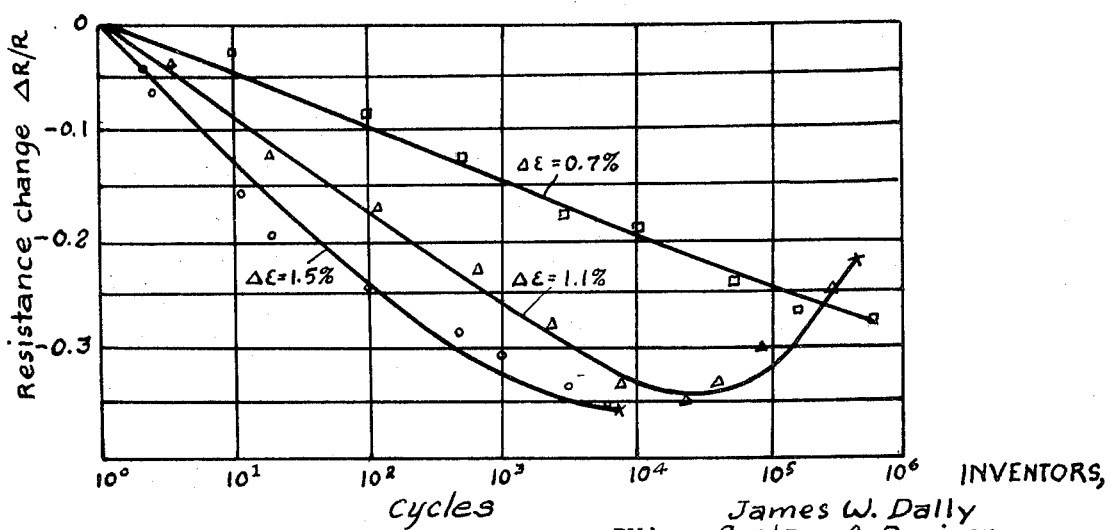
INVENTORS,
James W. Dally
BY: Gustavo A. Panizza
Harry M. Saragovitz, Edward J. Kelly & Herbert Berl
ATTORNEYS

FATIGUE DAMAGE INDICATOR

This invention relates to an improved apparatus for the determination of fatigue damage in a structure and more particularly to an apparatus having an improved sensing element.

A prior art method for predicting the effects of fatigue in structure due to variable cyclic loading comprises the employment of a device attached to the structural component which produces a signal output which is related to the commutative effect of strain cycling. When the structural component is subjected to a cyclic strain, the grid component undergoes a permanent resistance change as the metal foil, e.g., soft annealed constantan material, is work hardened. The resistance change can be as large as 5 to 8 percent and depends on the cyclic strain range and the number of strain cycles.

While the prior art device has been found to be a good indicator of fatigue damage, it cannot be classified as a precision instrument. The gage also suffers in that it can only be employed over a limited strain range. For cyclic strains of less than 1200–1400 micron in/in the change in permanent resistance is too small for accurate measurement. For cyclic strains of about 4000–5000 micron in/in the gage itself fails by fatigue. It cracks and the signal output is no longer meaningful. Although these strain limits can be broadened by mechanical alternators and amplifiers, these devices greatly increase the size of the gage installation and limit its applicability.

The limits on the strain range are very important since they in effect reduce the applicability of the gage to a relatively few engineering materials. The upper limit is too low for the gage to be employed on important classes of materials such as reinforced plastics or polymers. The lower limit is so high that the gage cannot be employed directly in many applications involving low strength steels or in any applications of glass, ceramics or concrete.

For the above reasons, a sensor was developed, which is designed to be adaptable to a wide range of engineering materials. The new sensor encompassed all of the desirable characteristics essential for field utilization, e.g., small size, remote discontinuous readout, simplicity in operation, reliability, and low cost.

The present invention is based on the accumulation of damage in a composite material consisting of a particle filled matrix. The composite material is designed to exhibit an electrical conductivity by properly dispersing a system of conducting particles in a matrix which serves as an insulator. A single conductor of the composite material attached to the component is exposed to a cyclic strain. The resistance of the composite undergoes a permanent change as the composite itself is damaged during cycling. This damage induces resistance change in the composite which can be related to fatigue damage induced in the structure component by strain cycling.

When an insulating matrix such as a glass, ceramic or polymer is filled with particles of a conducting material, the electrical resistivity of the resultant composite has an intermediate value between that of the matrix and the particles. The resistivity of the composite as well as its mechanical properties can be closely controlled by variations in the proportions and the characteristics of the two constituents.

There are three different mechanisms which produce resistance changes in an electrical particle filled composite under the action of cyclic strain. The mechanisms include particle wear, matrix particle debonding and matrix cracking.

At low cyclic strains, the wear mechanism is predominant in producing resistance changes. As the electrical composite is strain-cycled, the particles in contact, which produce the network of conducting paths, are displaced relative to each other. This relative motion results in wear which improves the area of contact between the particles. When the strain is removed, the cyclic induced wear has enhanced the conductivity and the overall resistance of the conductor is decreased. The decrease in resistance is permanent as the changes induced by wear on the contacting surfaces are permanent.

The wear occurs over many particles, e. g., 105 in a small conductor and the resistance change of this conductor is an integral average of these individual effects. Since there are so many particles involved in the process, the change in resistance will be a continuous function of the cyclic-strain history in spite of the fact that the amount of wear involved with individual particle pairs may not be the continuous functions of either the strain range or the number of cycles.

The average particle wear is increased, producing a greater decrease in resistance as the magnitude of the strain range is increased. The amount of resistance change per cycle of exchange is very much a function of the strain history. Very large changes in resistance occur on the first few cycles and these changes become progressively smaller as the particles are seated together.

It should be noted that the wear mechanism is operative at very small strain ranges. Thus, small permanent changes in resistance should be measurable at strain ranges approaching zero. The lower threshold appears to be limited by the capability of measuring small resistance changes rather than on attaining a threshold strain to trigger the mechanism producing the resistance change. The upper limit on strain capability is a function of the ability of the polymeric matrix to remain intact. This consideration leads to the second mechanism for producing resistant change, namely debonding at the particle-resin interface.

Debonding of the particles occurs locally at the particle matrix interface due to high strain concentrations associated with many different particles geometries and configuration.

The final mechanism involves complete failure of the conductor when cracks propagate through the matrix. As one, or at most a few cracks of this type occur, the effect on resistance is marked and discontinuous.

It is an object of this invention to provide and disclose an improved fatigue damage indicator.

It is a further object of this invention to provide and disclose an improved fatigue damage indicator comprising a sensing element composed of a conductive material dispersed in a non-conductive matrix.

It is a further object of this invention to provide and disclose an improved fatigue damage indicator which can be utilized over a wide range of materials.

Other objects and a fuller understanding of the invention may be ascertained from the following description and claims in which:

FIG. 1 is a diagrammatic view of a device in accordance with the present invention.

FIG. 2 is a sectional view through line 2—2 of FIG. 1.

FIG. 3 is a diagrammatic view of a system in accordance with the present invention including a workpiece and measuring means.

FIG. 4 is a graph illustrating the relative change in resistance ($\Delta R/R$) as a function of the number of cycles of strain for a graphite-epoxy composite.

Referring now to FIG. 1, the present device comprises sensing element 11 which is formed from a particle filled composite which is conductive. The particle filled composite, which may consist of a graphite-polymer mixture, is formed into a conductor between copper terminal tabs 13 and 15. This may be accomplished by brushing the particle filled composite material before the polymer has cured and solidified, as will be described later. The ends of sensing element 11 are enlarged to provide better contact with the terminals. The terminals and sensing element are bonded to plastic film or thin fiber glass carrier 17. This carrier serves to facilitate installation on a work piece and also to electrically insulate the sensor and its terminals from the work piece. The carrier 17 is bonded to work piece 19 utilizing any suitable means, e.g., adhesive. Lead wires 21 are connected to terminals 13 and 15 utilizing a series of soldered joints 23. The leads are connected to any suitable indicating device, e.g., ohmmeter 25.

In operation, under action of loads P on work-piece 19 the strains induced on work-piece 19 are transmitted by the bond to the fatigue damage indicator. As the strain on the work-piece is cycled, the resistance of sensing element 11 changes. This resistance change is permanent and can be recorded on ohmmeter 25 after any number of cycles. The percent of permanent resistance change of the sensing element is an indicator of the fatigue exposure of the work-piece. This invention thus provides a gage which can be monitored to indicate fatigue damage or exposure based on simply recording the resistance change on an ohmmeter.

An exemplary sensing element was constructed of 50 percent by weight of graphite (technical grade - Matheson, Coleman and Bell) and 50 percent by weight of a mixture of epoxy resins. The epoxy resin mixture consisted of 50 percent by weight of Epon 828 (Shell Chemical Corp.) and 50 percent by weight of Versamide 140 (General Mills chemical division). A small amount of toluene was added to the mixture to facilitate mixing and to provide a uniform distribution of the graphite flakes. The resultant mixture is cured at room temperature for a period of 8 hours in order to permit toluene to evaporate, and subsequently cured at 175° for a period of 8 hours.

The present graphite-epoxy composite sensing means were mounted on tensile specimens fabricated from Scotchply type 1000 glass reinforced plastic. The specimens were cycled in fatigue employing a Budd double-direct fatigue machine. Typical response curves for three specimens of the above tensile specimens having strain ranges ($\Delta\epsilon$) of 0.7, 1.1 and 1.5 percent per cycle are presented in FIG. 4. It is evident from the graph that the resistance change is very large and can be measured with no difficulty.

Although we have described our invention with a certain degree of particularity, it is understood that the present disclosure has been made only by way of example and that numerous changes in the details of construction and the combination and arrangement of parts may be resorted to without departing from the spirit and scope of the invention as hereinafter claimed.

Having described our invention we claim:

1. In a fatigue damage indicator comprising the following components; carrier means, sensing means connected to the carrier means, lead means connected to the sensing means, indicator means connected to the lead means; operably mounted on a structure so that strains in the test structure are transmitted to the sensing means; the improvement wherein the sensing element comprises a conducting material consisting of graphite dispersed in a matrix of an insulating material consisting of an epoxy resin, each component consisting of approximately 50 percent by weight of the sensing means.

* * * * *